United States Patent Office

3,293,215
Patented Dec. 20, 1966

3,293,215
ALKYLVINYL KETONE-ACETALDEHYDE
COPOLYMERS
Jerry N. Koral, Stamford, Conn., assignor to American Cyanamid Company, Stamford, Conn., a corporation of Maine
No Drawing. Filed Feb. 25, 1963, Ser. No. 260,905
9 Claims. (Cl. 260—64)

This invention relates to a process for the production of novel polymers and to the polymers per se. More particularly, this invention relates to a novel process for the production of a novel group of copolymers of aldehyde monomers and vinyl monomers in which the aldehyde monomer polymerizes through the carbonyl group and the vinyl monomer polymerizes through the vinyl group. Still more particularly, this invention relates to a process for the production of a novel group of thermoplastic resinous copolymers of acetaldehyde and various vinyl ketone monomers having the formula (I)
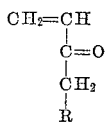

wherein R is hydrogen or an alkyl group having 1 to 3 carbon atoms, inclusive, which comprises reacting said monomers in the presence of a tertiary phosphine catalyst having a pKa of at least about 8.0

Previous to my invention, addition copolymers produced from acetaldehyde and various vinyl ketones were not, to my knowledge, known. The use of tertiary phosphine catalysts in other polymerization procedures, however, is relatively well known. That is to say, the use of tertiary phosphines as catalysts for the polymerization of acrylamide, acrylonitrile (U.S. Patent 2,675,372) and formaldehyde (U.S. Patents 2,768,994, and 2,828,286) has been shown.

It has not been known, however, previous to my invention, that various tertiary phosphines may be used to initiate the addition copolymerization of acetaldehyde and various vinyl ketones.

The use of the tertiary phosphine catalysts as the initiators in the present process has the advantage of creating a process wherein the operator may very easily handle the catalysts and not fear spontaneous combustion in the air. Additionally, the polymerization proceeds very rapidly and may be carried out at atmospheric pressure thereby obviating the use of extraneous equipment. Another feature of the process of the present invention is that trace amount of oxygen do not materially effect the reaction and therefore, although the prevention of atmospheric contact is usually desirable, oxygen exclusion does not have to be closely scrutinized.

It is therefore an object of the instant invention to present a novel process for the copolymerization of acetaldehyde and various vinyl ketones.

It is a further object of the instant invention to present a novel process for the copolymerization of acetaldehyde and various vinyl ketones utilizing, as the polymerization initiator, a tertiary phosphine having a pKa of at least about 8.0.

It is still a further object of the instant invention to present a novel group of thermoplastic addition copolymers of acetaldehyde and various vinyl ketones.

These and other objects will become more apparent to those skilled in the art upon reading the more detailed description set forth hereinbelow.

THE POLYMERIZATION PROCESS

As mentioned above, I have discovered that certain tertiary phosphines, i.e. those having a pKa of at least about 8.0, possess the ability to initiate the addition copolymerization of acetaldehyde and various vinyl ketones. Specifically, I have found that addition copolymers of the vinyl ketones represented by Formula I and acetaldehyde may be produced using tertiary phosphines as the catalyst. The process comprises reacting the two monomers under certain reaction conditions, in the presence of tertiary phosphines having minimum pKa values.

Examples of compounds which are represented by Formula I, and therefore find use as comonomers in the process of the present invention include methyl vinyl ketone, ethyl vinyl ketone, n-propyl vinyl ketone, isopropyl vinyl ketone, n-butyl vinyl ketone, t-butyl vinyl ketone, isobutyl vinyl ketone and the like.

The process of the present invention is preferably carried out at a temperature ranging from about —20° C. to about 50° C., preferably about 0° C. to about 25° C. As mentioned above, atmospheric pressure is generally employed, however, it should be noted that subatmospheric or superatmospheric pressures may be employed, if necessary, without detracting from the efficacy of the instant process.

The molar ratio of vinyl ketone monomer to acetaldehyde ranges from about 25:1 to 1:25, respectively, preferably from about 10:1 to about 1:10, respectively.

In conducting the process of the present invention it is not necessary to carry out the reaction under solution conditions. It is however, oft times more effective to employ solvents, in that the speed of reaction can be more effectively controlled. When solvents are employed, such materials as the aromatic hydrocarbons, e.g., benzene, toluene; methylene chloride, acetonitrile, dimethyl formamide, chlorobenzene, the saturated aliphatic hydrocarbons, e.g., pentane, hexane, and the like and the aliphatic alcohols such as methanol, ethanol, and the like may be used.

As has been previously set forth, the catalysts employed in the process of the present invention comprise the tertiary phosphines having pKa values of at least about 8.0. Examples of the tertiary phosphines which are contemplated as useful in the instant process include ethyldimethyl phosphine, methyldiethyl phosphine, tripropyl phosphine, triisobutyl phosphine, tri-n-butyl phosphine, triamyl phosphine, trimethyl phosphine, triethyl phosphine, di-n-butoxyethyl phosphine, 1-methyl phosphorinane and the like.

The catalyst concentrations of the tertiary phosphine initiators generally range from about 0.5% to 10%, by weight, preferably 1.0% to 5%, by weight, based on the weight of the monomers undergoing copolymerization.

When reacting the above monomers in the presence of the phosphine catalysts, with or wtihout a solvent, it is critical in the process of the instant invention that the monomer, catalyst and solvent be substanially pure. In regard to the monomer, it is preferred that monomers be used which have been freshly prepared. This may be accomplished, for example, in regard to the acetaldehyde, by the decomposition of paraldehyde immediately before use. However, when monomers previously prepared are used in my novel process, they should be first purified by drying, e.g., by contact with a material such as magnesium sulfate and distilling. Generally this purification procedure is conducted just before the polymerization of the monomers. The solvent and catalyst employed must also be substantially pure. These materials can be made such by various known techniques. By the phrase "substantially pure" as used in the present disclosure, is meant substantially anhydrous and substantially oxygen-free. By "substantially anhydrous" is meant containing less than about 1% of water, separately or in combination. By "substantially oxygen-free" is meant containing less than about 2% of oxygen.

The reaction, as it proceeds, is maintained substantially oxygen-free by utilization of inert gases which may be bubbled through the reaction media or in other ways kept in contact therewith. Various inert gases which may be used include nitrogen, argon, neon, the normally gaseous hydrocarbons such as propane and various other non-oxygen-containing materials.

The time of contact of the monomers employed in the process of the present invention generally ranges from about 10 hours to 100 hours depending upon the degree of conversion desired. That is to say, a higher degree of conversion may be obtained by employing the higher contact times while lower contact times result in a decreased conversion.

The pKa value, as the term is employed in the present invention refers to the acid strength and not to the acid capaciy of the tertiary phosphine initiator. It is a equilibrium concept which signifies the relative strength of the acid or base under consideration. In the present invention, the higher the pKa, the more basic the tertiary phosphine. Further definitions and illustrations of the pKa values may be found in the following articles: J. Am. Chem. Soc., volume 54, page 1212 (1932); J. Am. Chem. Soc., volume 58, page 1124 (1936); Branch et al., Theory of Organic Chemistry, Prentiss Hall Publishers, pages 183–270 (1936).

THE NOVEL COPOLYMERS

The novel copolymers of the present invention are produced by the copolymerization of the acetaldehyde through the carbonyl group and the vinyl ketone monomer through the vinyl group. The polymers are of the addition type and, although I do not wish to be bound by any specific theory or reaction mechanism hereinafter advanced, it is believed that the structure of my novel copolymers, as evidenced by ultra-violet and infrared analysis measurements, is as follows:

(II)
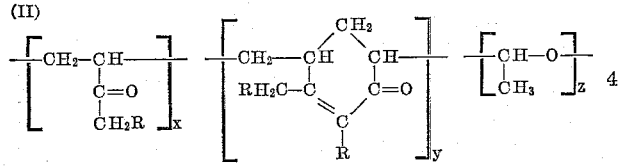

wherein R is as defined above in regard to Formula I and the ratio of $x:y:z$ ranges from about 1:1:1 to 1:3:10.

The molecular weight of the copolymers produced by the process enumerated above are not critical, however, copolymers are obtained which have molecular weights ranging generally from about 1000 to about 8000, as determined by measurement of the intrinsic viscosity of the copolymers in methyl ethyl ketone at 30° C. The copolymers synthesized are amorphous solids, soluble in most common organic solvents (i.e., benzene, methyl ethyl ketone, methylene chloride, etc.). The softening point of the copolymers ranges from about 75° C. to 95° C. Thermogravimetric analysis indicates a $T_1$ of about 125 to 155° C. and a $T_{10}$ of 310 to 320° C.

These thermoplastic resinous copolymeric materials are film-forming resins and they, as such, may be used in such applications as surface coatings, molding compositions, adhesives, various resin modifiers, and the like. They may additionally be cross-linked with such materials as diamines thereby producing thermosetting or thermoset articles.

The following examples are set forth for purposes of illustration only and are not to be construed as limitations on the present invention except as set forth in the appended claims. All parts and percentages are by weight unless otherwise indicated.

Example 1

A mixture of 3.14 parts of freshly prepared acetaldehyde and 2.24 parts of dry methyl vinyl ketone is placed in a suitable reaction vessel at 0° C. Prepurified nitrogen is bubbled through the solution for five minutes and then 0.21 part of tributyl phosphine (pKa=8.43), dissolved in 0.35 part of methanol, is added. After thirty minutes, the solution develops a slight yellow color and some increase in viscosity is observed. The reaction is continued for 18 hours. 18 parts of methanol is then added to mixture and the polymer is precipitated into a large excess of water. The polymer is suction filtered and dried in a vacuum oven at 55° C. for twenty-four hours. A yield of 2.48 parts of a yellow polymer, corresponding to 46% conversion is obtained. The intrinsic viscosity of the polymer in methyl ethyl ketone at 30° C. is 0.04. The structure of the polymer is

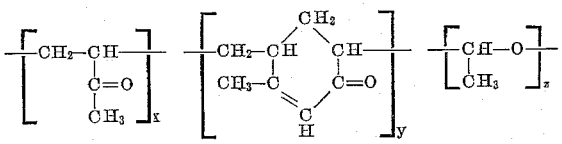

as indicated by infrared analysis. The ratio of $x:y:z$ is approximately 1:1:1.

Example 2

A mixture of 7.90 parts of acetaldehyde, 1.12 parts of methyl vinyl ketone and 10.0 parts of methylene chloride is charged to a reaction vessel. Prepurified nitrogen is bubbled through the mixture for five minutes and then 0.13 part of tributyl phosphine dissolved in 0.3 part of methanol is added. The reaction is allowed to continue for 100 hours. The excess monomer and solvent are removed by vacuum evaporation. The resin is dried in a vacuum oven at 55° C. for 24 hours. A yield of 6.3 parts, corresponding to a conversion of 70% is obtained. The intrinsic viscosity of the resin in methyl ethyl ketone at 30° C. is 0.03. The polymer has a structure similar to that of the polymer produced in Example 1. The ratio of $x:y:z$ is approximately 1:1.8:5.

Example 3

A mixture of 7.06 parts of acetaldehyde and 1.68 parts of methyl vinyl ketone is charged to a reaction vessel at 0° C. Prepurified nitrogen is bubbled through the mixture for five minutes and then 0.13 part of tripropyl phosphine (pKa=8.64) dissolved in 0.3 part of methanol is added. The reaction is allowed to continue for 100 hours during which time an appreciable build-up in viscosity occurs. The excess monomer is removed by vacuum evaporation. The resin is dried in a vacuum oven at 55° C. for 24 hours. A yield of 6.7 parts, corresponding to a 76.5% conversion is obtained. The intrinsic viscosity of this resin in methyl ethyl ketone is 0.05 at 30° C. A polymer having a structure similar to that of Example 1 is produced. The ratio of $x:y:z$ is approximately 1:1.7:3.

Example 4

A mixture of 4.71 parts of acetaldehyde and 1.68 parts of butyl vinyl ketone is charged to a reaction vessel at 0° C. Prepurified nitrogen is bubbled through the solution for five minutes and then 0.21 part of tributyl phosphine dissolved in 0.35 part of methanol is added. The reaction is allowed to continue for 18 hours. The excess monomer is removed by vacuum evaporation. The polymer is dried at 55° C. for 18 hours. A yield of 4.2 parts corresponding to a 66% conversion is obtained. The intrinsic viscosity of this resin in methyl ethyl ketone at 30° C. is 0.03. The structure of the polymer is

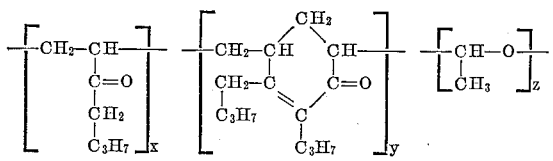

Infrared analysis indicates at a ratio of $x:y:z$ approximately equal to 1:1.5:4. A film is cast from a benzene solution of the polymer which exhibits excellent flexibility.

*Example 5*

A mixture of 7.06 parts of acetaldehyde and 1.68 parts of methyl vinyl ketone is charged to a reaction vessel at 0° C. Prepurified nitrogen is bubbled through the solution for 5 minutes. Then 0.25 part of phenyl diethylphosphine (pKa=6.25), dissolved in 0.5 part of methanol is added. The reaction is allowed to continue for 100 hours. No polymer is isolated from this reaction.

*Example 6*

A mixture of 7.06 parts of acetaldehyde and 1.68 parts of methyl vinyl ketone is charged to a reaction vessel at 0° C. Prepurified nitrogen is bubbled through the solution for 5 minutes. The 0.25 part of triphenyl phosphine (pKa=2.73) dissolved in 0.6 part of methylene chloride is added. The reaction is allowed to continue for 100 hours. No polymer is isolated from this reaction mixture.

*Example 7*

A mixture of 6.50 parts of propionaldehyde and 1.12 parts of methyl vinyl ketone is charged to a reaction vessel at 0° C. Prepurified nitrogen is bubbled through the solution for five minutes. Then 0.10 part of tributyl phosphine, dissolved in 0.2 part of methanol, is added. The reaction is allowed to proceed for 100 hours. No polymer is isolated at the end of this time.

*Example 8*

A mixture of 0.81 part of acrylonitrile and 0.79 part of acetaldehyde is charged to a reaction vessel at 0° C. Prepurified nitrogen is bubbled through the solution for five minutes. Then 0.12 part of tributyl phosphine, dissolved in 0.25 part of methanol, is added. The reaction is allowed to proceed for 100 hours. No polymer is isolated from this reaction.

*Example 9*

A mixture of 0.95 part of methyl acrylate and 0.79 part of acetaldehyde is charged to a reaction vessel at 0° C. Prepurified nitrogen is bubbled through the solution for five minutes. Then 0.12 part of tributyl phosphine, dissolved in 0.25 part of methanol, is added. The reaction is allowed to proceed for 100 hours. No polymer is isolated from this reaction.

*Example 10*

A mixture of 3.16 parts of acetaldehyde and 1.0 parts of methyl ethyl ketone is charged to a reaction vessel at 0° C. Prepurified nitrogen is bubbled through the solution for five minutes. Then 0.12 part of tributyl phosphine, dissolved in 0.25 part of methanol, is added. The reaction is allowed to proceed for 100 hours. No polymer is isolated from this reaction.

I claim:
1. A process which comprises contacting acetaldehyde with a vinyl ketone having the formula

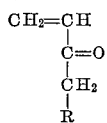

wherein R is selected from the group consisting of hydrogen and an alkyl radical having from 1 to 3 carbon atoms, inclusive, in the presence of a tertiary phosphine having a pKa of at least about 8.0 and at a temperature ranging from about −20° C. to about 50° C.

2. A process which comprises contacting acetaldehyde with methyl vinyl ketone in the presence of a tertiary phosphine having a pKa of at least about 8.0 and at a temperature ranging from about −20° C. to about 50° C.

3. A process which comprises contacting acetaldehyde with a vinyl ketone having the formula

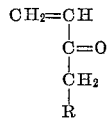

wherein R is selected from the group consisting of hydrogen and an alkyl radical having from 1 to 3 carbon atoms, inclusive, in the presence of tertiary butyl phosphine and at a temperature ranging from about −20° C. to about 50° C.

4. A process which comprises contacting acetaldehyde with methyl vinyl ketone in the presence of tertiary butyl phosphine and at a temperature ranging from about −20° C. to about 50° C.

5. A copolymer having the structural formula

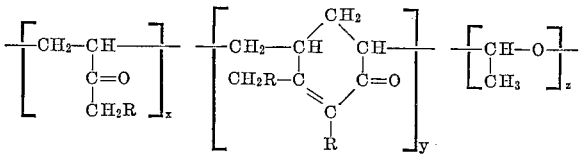

wherein R is selected from the group consisting of hydrogen and an alkyl radical having from 1 to 3 carbon atoms, inclusive, and the ratio of $x:y:z$ ranges from about 1:1:1 to about 1:3:10:

6. A copolymer having the structural formula

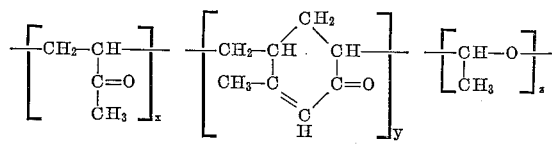

the ratio of $x:y:z$ ranging from about 1:1:1 to about 1:3:10.

7. A copolymer having the structural formula

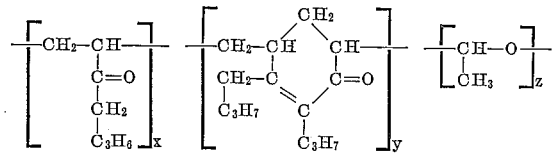

the ratio of $x:y:z$ ranging from about 1:1:1 to about 1:3:10.

8. A copolymer of acetaldehyde and a vinyl ketone having the formula

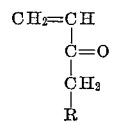

wherein R is selected from the group consisting of hydrogen and an alkyl radical having from 1 to 3 carbon atoms, inclusive.

9. A copolymer of acetaldehyde and a vinyl ketone having the formula

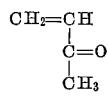

(References on following page)

References Cited by the Examiner

UNITED STATES PATENTS

| | | | |
|---|---|---|---|
| 2,264,034 | 11/1941 | Allen | 260—64 |
| 2,921,055 | 1/1960 | Heisenberg et al. | 260—63 |
| 2,924,589 | 2/1960 | Jurgeleit | 260—67 |
| 3,122,524 | 2/1964 | Koral et al. | 260—67 |

OTHER REFERENCES

Russian Chemical Reviews, vol. 31, No. 4, pp. 225–235, April 1962 (page 228 relied on).

WILLIAM H. SHORT, *Primary Examiner.*

L. M. MILLER, *Assistant Examiner.*